United States Patent
Sadler et al.

[19]

[11] Patent Number: 5,903,474
[45] Date of Patent: May 11, 1999

[54] OPTIMIZATION OF MACHINING WITH PROGRESSIVELY WORN CUTTING TOOLS

[75] Inventors: John P. Sadler; Ibrahim S. Jawahir; Zhongjie Da; Seog S. Lee, all of Lexington, Ky.

[73] Assignee: University of Kentucky Research Foundation, Lexington, Ky.

[21] Appl. No.: 08/846,381

[22] Filed: Apr. 30, 1997

Related U.S. Application Data

[63] Continuation-in-part of application No. 08/744,907, Nov. 8, 1996.

[51] Int. Cl.$^6$ ............................ G06F 19/00; G06G 7/66
[52] U.S. Cl. .................. 364/551.02; 364/148; 364/149; 364/474.01; 364/474.15
[58] Field of Search ............................ 364/551.02, 148, 364/149, 150, 151, 152, 153, 474.01, 474.02, 474.15, 474.16, 474.17, 578; 82/1.11; 318/561, 569, 570, 571; 73/104, 105

[56] References Cited

U.S. PATENT DOCUMENTS

| | | | |
|---|---|---|---|
| 3,671,737 | 6/1972 | Rhoades | 235/151.11 |
| 3,671,839 | 6/1972 | Meyer et al. | 318/571 |
| 3,873,816 | 3/1975 | Takeyama et al. | 235/151.11 |
| 4,594,270 | 6/1986 | Brooks | 427/213 |
| 4,833,617 | 5/1989 | Wang | 364/474.15 |
| 4,926,309 | 5/1990 | Wu et al. | 364/149 |
| 5,255,201 | 10/1993 | Maeda | 364/474.35 |
| 5,285,378 | 2/1994 | Matsumoto | 364/157 |
| 5,303,385 | 4/1994 | Hattori et al. | 395/22 |
| 5,331,565 | 7/1994 | Hattori et al. | 364/472 |
| 5,347,446 | 9/1994 | Iino et al. | 364/149 |
| 5,377,116 | 12/1994 | Wayne et al. | 364/474.17 |
| 5,457,625 | 10/1995 | Lim et al. | 364/149 |
| 5,486,995 | 1/1996 | Krist et al. | 364/149 |
| 5,659,493 | 8/1997 | Kiridena et al. | 364/578 |
| 5,689,062 | 11/1997 | Jawahir et al. | 73/104 |
| 5,691,909 | 11/1997 | Frey et al. | 364/474.01 |

OTHER PUBLICATIONS

DA, Z.J.; Multiple Criteria Optimization of Finish Turning Operations Based on a Hybrid Model; Proceedings of the 1996 ASME Design Engineering; Aug. 18–22, 1996; 1–10.

DA, Z.J.; Optimum Machining Performance in Finish Turning With Complex Grooved Tools; ASME 1995 International Mechanical Engineering; Nov. 12–17, 1995.

DA, Z.J.; Predicting Optimum Cutting Conditions For Turning Operations At Varying Tool–Wear States; ASME; 1996.

*Primary Examiner*—James P. Trammell
*Assistant Examiner*—Patrick Assouad
*Attorney, Agent, or Firm*—King and Schickli

[57] ABSTRACT

A method for achieving optimum selection of machining parameters and tool inserts for finish turning operations is provided. The method allows for the simultaneous consideration of the various machining performance criteria which are highly interactive and need to be taken into consideration when defining optimum cutting conditions or selecting optimum tool inserts. The method broadly includes the steps of (1) developing a process model relating performance variables for said operation with process parameters for said operation; (2) applying multiple criteria optimization techniques to construct a utility function relating the tool life and material removal rate for optimization, using surface roughness, cutting power, and chip breakability as constraints; (3) applying non-linear programming techniques to the process model so that optimum cutting conditions may be selected for given machining performance requirements. This method may also take into account the progressive wear state of the tool being used.

13 Claims, 5 Drawing Sheets

OBJECTIVE CONTOURS AND CONSTRAINTS FOR
MAXIMUM EFFICIENCY CRITERION
($w_1$=0.4, $w_2$=0.6, CUTTING SPEED=381 M/MIN)

OBJECTIVE CONTOURS AND CONSTRAINTS FOR
MAXIMUM EFFICIENCY CRITERION
($w_1$=0.6, $w_2$=0.4, CUTTING SPEED=230 M/MIN)

OPTIMIZATION OF MACHINING WITH PROGRESSIVELY WORN CUTTING TOOLS

This is a continuation-in-part of copending U.S. patent application Ser. No. 08/744,907, filed Nov. 8, 1996 and entitled "Method of Predicting Optimum Machining Conditions".

TECHNICAL FIELD

The present invention relates generally to the field of machining performance and finish turning operations and, more particularly, to a method for selecting optimum cutting conditions and/or tool inserts for specified machining performance requirements, including a method of considering the effects of progressive tool wear in the selection process.

BACKGROUND OF THE INVENTION

The demands of modern manufacturing technology require that machining operations be performed in a manner so as to efficiently enhance economic, time and equipment aspects of the manufacturing process. Recent trends toward "near net shape" manufacturing have significantly reduced the need for multipass rough machining operations while placing more emphasis on single pass finish machining. Therefore, it is important to consider the finish machining requirements in process planning for machining operations.

Generally, the overall machining performance can be qualitatively described by the surface roughness, machining accuracy, cutting force/power, tool wear/tool life and chip breakability. Key factors which are known to effect machining performance include the machine tool, cutting tool, cutting parameters, work material, and cutting fluid. The various machining performance criteria are highly interactive and the relationships describing the interaction are very complex. Therefore, due to these complexities, many of these highly desirable features are very difficult to achieve in combinations as the trade off in achieving one normally results in significant loss in others. For example, in finish turning operations, increasing productivity through higher material removal rates requires that cutting tools be provided which are capable of longer tool life while still being capable of maintaining the required surface finish level and acceptable chip-forms/shapes or chip breakability. In addition, increased cutting speeds impose a power constraint.

U.S. Pat. No. 4,833,617 to Wang discloses a method for modeling an adaptive feed rate control for numerically controlled machining. This method takes into consideration such operating parameters as material removal rate, cutting force and tool deflection. However, there are numerous other operating parameters, as described above, which if taken into consideration would increase the accuracy of the modeling method.

Similarly, U.S. Pat. No. 4,926,309 to Wu et al. discloses a method that utilizes artificial intelligence for adaptive machining control of surface finish in a machining operation. The Wu et al. method takes into consideration a variety of operating parameters, such as, tool wear, depth of cut, work material hardness and material removal rate. Again, however, only a limited number of operating parameters and machining performance criteria are taken into consideration, thus significantly limiting the reliability and overall accuracy provided by this method.

The Wang and Wu et al. patents are representative of the prior art which typically rely upon a limited number of operating parameters and consider limited number of machining performance criteria. In other words, the prior art has essentially ignored important machinability criteria and key factors which form the machining performance. This may be attributed to the limited availability of quantitatively reliable machining performance models relating the surface finish, dimensional accuracy, chip breakability, and other machining performance variables to the cutting or process parameters. More specifically, currently available metal cutting theories are unable to explicitly present all relationships between input variables and machining behavior, especially for complex grooved tools which are primarily used in finish turning operations today. While there have been many attempts to build phenomenological models of metal cutting processes, these theories are not yet able to solve all the problems which currently exist during the machining operation. Moreover, the large number of variables involved in the machining process results in the need for considering an almost infinite number of machining combinations.

Also, all past research on machining optimization is based on the critical assumption that the machining process occurs with fresh or unworn cutting tools. Of course, in actual machining, the performance may vary significantly with the progression of overall tool wear during the process.

Accordingly, while much is known and much work has been done towards improving the machining process and its efficiency for finish turning operations, a need is identified for further improving the machining process through the selection of the most suitable cutting conditions and/or tool insert types for given quality requirements. Such an optimization method would be able to take all machinability parameters simultaneously into consideration. Furthermore, such an optimization method would be able to take into account the varying tool wear state during the machining process.

SUMMARY OF THE INVENTION

Accordingly, it is a primary object of the present invention to provide a new and improved method for selecting optimum machining parameters and tool inserts in finish turning operations overcoming the above described limitations and shortcomings of the prior art. More specifically, the method allows for selecting optimum cutting conditions and/or tool inserts based upon a particular set of machining performance requirements for a finish turning operation.

Another object of the present invention is to provide a method for selecting optimum machining performance criteria in finish turning operations which allows the process planner to individually weigh the performance variables of tool life and material removal rate in determining optimum machining conditions.

A further object of the present invention is to provide a method for selecting optimum machining performance criteria in finish turning operations which is able to take all major machinability parameters simultaneously into consideration.

Yet another object of the present invention is to provide a method for selecting optimum machining conditions in finish turning operations by developing a process model which takes into consideration a combination of analytical results and experimental data to determine new relationships between machinability parameters and machining conditions. Nonlinear programming techniques may then be applied, in conjunction with the process model for achieving an optimum selection of cutting conditions and/or cutting tool inserts.

Also another object of the present invention is to provide a method for selecting optimum machining conditions in finish turning operations that allows for the progressive tool wear state to be taken into consideration.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved method is provided for achieving optimum machining performance in finish turning operations. Generally, the method includes the first step of developing a process model. The process model defines the relationship between the machining performance criteria and machining conditions and more particularly describes the relationship between a group of selected performance variables and a group of selected process parameters for a selected finish turning operation. More specifically, the performance variables may be selected from the group consisting of cutting force, tool life, material removal rate, surface roughness and chip breakability. In addition, the process parameters may be selected from a group consisting of cutting speed, feed, and depth of cut. Advantageously, the process model attempts to interrelate a large number of machining performance criteria so as to improve the overall accuracy and efficiency of the optimization method.

The method may also be broadly described as including the step of selecting one of the performance variables as the optimization objective. In the preferred method, multiple criteria optimization methods are used to define a utility function that relates the performance variables of tool life and material removal rate. The remaining performance variables will then be used as constraints to define acceptable limits on the particular criteria chosen. Additional constraints involve direct limits on the ranges of the process variables.

The method further includes the step of applying non-linear programming techniques to the process model in order to identify optimum machining performance and machining parameters. More specifically, the non-linear programming techniques allow for the determination of optimum cutting conditions for a given tool insert and/or an optimum tool insert may be selected for given performance requirements.

The method may also include the additional step of recording the tool wear state and considering the effect of progressive tool wear in selecting the optimum cutting conditions and/or optimum tool inserts.

More specifically describing the method, the development of the process model includes defining the relationships between the performance variables and the process parameters based upon either classic theories of metal cutting or a database of experimental results. Specifically, the database of experimental results will be used to determine empirical constants and, coupled with numerical methods for data interpolation, to describe relationships that cannot be analytically determined by theory.

The process model includes modeling the performance variable cutting force based upon cutting force values expressed in the form:

$$F_z = C_z f^{\alpha_z} d^{\beta_z} + E_z d^{\gamma_z} \tag{1}$$

Where:
 $F_z$=component of cutting force in the cutting direction
 f=feed
 d=depth of cut
 $C_z$ and $E_z$=force constants
 $\alpha_z$=feed exponent
 $\beta_z$ and $\gamma_z$=depth of cut exponents The process model includes modeling the performance variable tool life in the form:

$$T = \frac{C}{V^{\frac{1}{n}} f^{\frac{1}{m}} d^{\frac{1}{l}}} \tag{2}$$

Where:
 T=tool-life
 V=cutting speed
 f=feed
 d=depth of cut
 C, n, m, and l=constants for given combination of work and tool material The process model includes modeling the performance variable material removal rate (MRR) in the form:

$$MRR = 1000 Vfd \tag{3}$$

Where:
 V=cutting speed m/min
 f=feed mm/rev
 d=depth of cut mm

The step of developing the process model further includes modeling the remaining performance variables, surface roughness and chip breakability, based upon a database of experimental results for actual surface roughness and chip breakability values. The experimental test data coupled with numerical methods for data interpolation allow for the inclusion of these particular performance variables which otherwise cannot be analytically determined. More specifically, bi-cubic spline interpolation of surface roughness test data is used to obtain the surface roughness in terms of feed and depth of cut. Similarly, a bi-cubic spline interpolation of chip breakability test data is used to determine the chip breakability in terms of feed and depth of cut.

The step of selecting the optimization objective may be more specifically described as selecting one or more machine performance measure(s) as the optimization objective. This step may include applying multiple criteria optimization techniques to construct a utility function. As economic production in a finish turning process is concerned with higher material removal rate and longer tool life in relation to other required machining performance criteria, this utility function is ideally used to relate the important performance variables of tool life and material removal rate. Advantageously, the process planner may use the utility function to assist in determining the optimum machining conditions based on these economic considerations.

After such a determination is made, the remaining performance variables, as well as the direct limits on the range of process parameters, will then be used as constraints to define acceptable limits on the particular criteria chosen. Thus, all of the performance variables and process parameters are utilized during the selection of optimum machining performance conditions even though only one particular performance variable chosen is being optimized.

Further, the method includes the step of applying non-linear programming techniques to the process model in order to identify optimum machining performance and machining parameters. More specifically, the non-linear programming techniques allow for the determination of optimum cutting conditions for a given tool insert and/or an optimum tool insert may be selected for given performance requirements.

As a further aspect of the current invention, the method may also include the step of recording the tool wear state and considering the effect of progressive tool wear in selecting the optimum cutting conditions and/or optimum tool inserts. An equation for recording the tool wear state is developed. Using experimental data coupled with numerical methods, the effect of progressive tool wear on the machining operation may be analyzed in terms of the performance variables and cutting parameters. The tool wear state may then be considered in determining the optimum machining performance.

In the most preferred embodiment, the present method is computer implemented: that is, a software package facilitates application of the methodology. Advantageously, the computer implemented method allows for the establishment of the relationship between the performance variables and the process parameters through the creation of the process model. The user of the computer implemented method is allowed to interface with the software so as to choose different machining performance criteria, more specifically different performance variables, as optimization objectives and to further define the desired constraints in qualitative terms. Further, the computer implemented method provides for the implementation of the nonlinear programming techniques to select optimum cutting conditions and/or optimum tool inserts.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention and together with the description serves to explain the principles of the invention. In the drawings.

Reference will now be made in detail to the present preferred embodiment of the invention, an example of which is illustrated in the accompanying drawings.

DETAILED DESCRIPTION OF THE INVENTION

It is well known that when designing for finish turning operations, it is extremely important that all the basic machinability factors be achievable. The various performance criteria present in a finish turning operation are highly interactive and the relationships defining the performance criteria are very complex. This makes the selection of optimum machining performance criteria very difficult to achieve. Accordingly, the present method provides for taking all machinability parameters simultaneously into consideration allowing for the optimization of a machining process for optimum performance parameters and selection of the most suitable cutting conditions and/or tool insert types for specified requirements.

Figure 1:
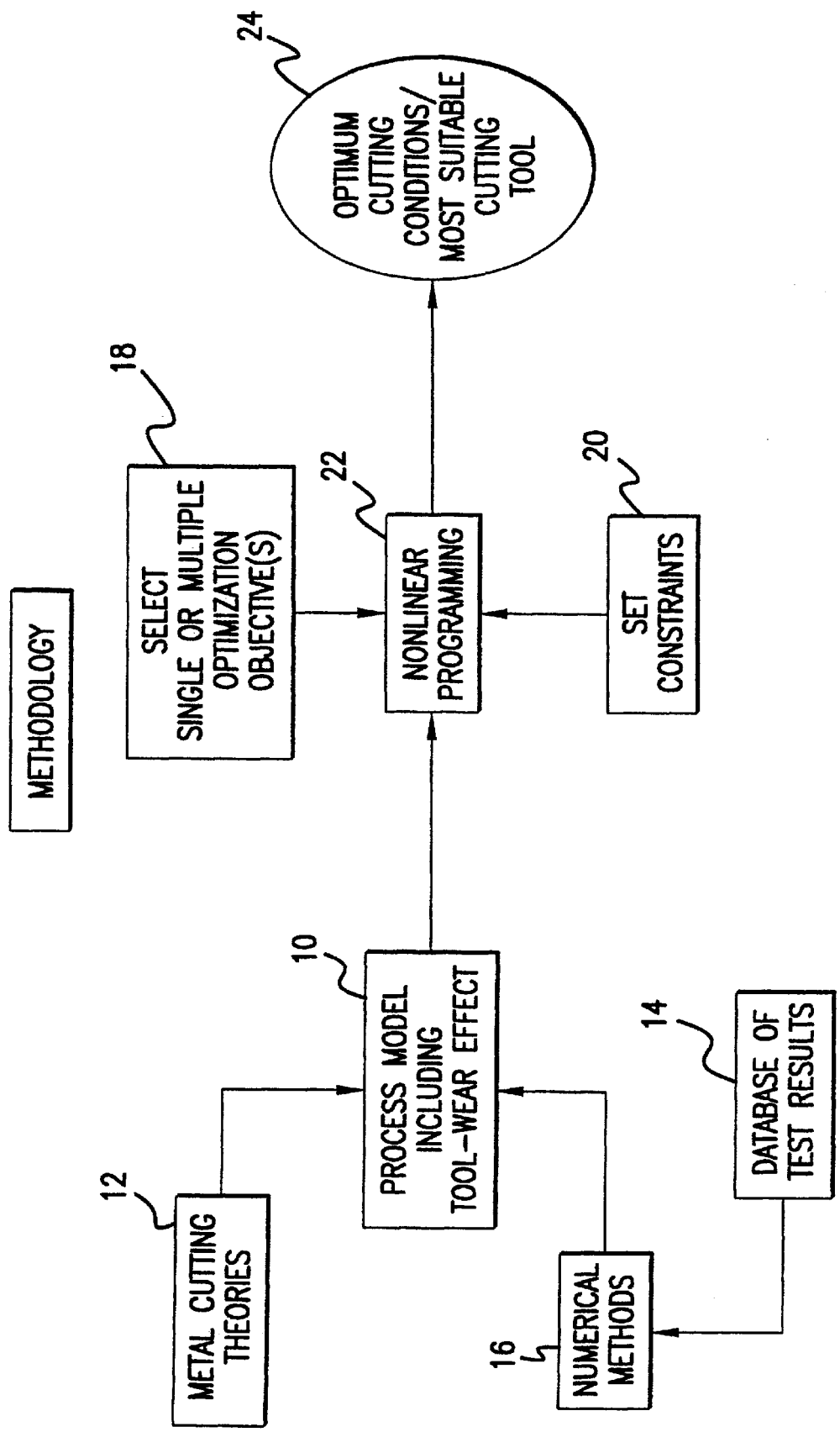
FIG. 1 is a flow chart illustrating the methodology of the present method, including considering the tool wear state in determining optimum machining performance criteria in finish turning operations.

With reference to FIG. 1, there is shown the methodology of the present invention for selecting optimum machining conditions in finish turning operations. More specifically, the method includes the step of first developing a process model 10 for defining the relationships between a group of dependent performance variables and a group of independent process parameters. The development of the process model 10 includes applying classic metal cutting theories 12 to the performance variables which may be determined analytically. In addition, development of the process model 10 includes providing a database of experimental test results 14 to which numerical methods 16 are applied for describing the relationships between the remaining performance variables which cannot be analytically determined. This results in the development of the process model 10 which simultaneously takes into consideration the performance variables and the process parameters, thus defining the relationships therebetween.

The performance variables which are defined within process model 10 may be selected from a group of variables consisting of cutting force, tool life, material removal rate, surface roughness and chip breakability. Furthermore, the process parameters may be selected from a group consisting of cutting speed, feed and depth of cut. Thus, it should be appreciated that the various performance criteria which go into the development of the process model 10 takes into consideration the maximum amount of performance criteria. This insures the accuracy and reliability of the present method for selecting optimum machining conditions. However, it should be appreciated that additional performance variables and process parameters may be included while still maintaining the overall methodology of the present invention.

More specifically describing the development of the process model 10, the performance variables, cutting force, tool life and material removal rate are modeled based upon the analytical determination of these variables. In contrast, the process model 10 includes modeling the performance variables surface roughness and chip breakability based upon the application of numerical methods for data interpolation to a database of experimentally obtained test results for these particular variables.

Particularly, development of the process model 10 includes modeling the performance variable cutting force based upon cutting force values expressed in the form:

$$F_z = C_z f^{\alpha_z} d^{\beta_z} + E_z d^{\gamma_z} \quad (1)$$

Where:
F=component of cutting force in the cutting direction
f=feed
d=depth of cut
$C_z$ and $E_z$=force constants
$\alpha_z$=feed exponent
$\beta_z$ and $\gamma_z$=depth of cut exponents Note: All constants and exponents in Equation 1 are obtained by using the least square technique and experimental results, see Da, Z. J. et al.; "Optimum Machining Performance in Finish Turning with Complex Grooved Tools"; Manufacturing Science and Engineering, MED—Volume 2, No. 1/MH—Volume 3, No.1, ASME; 1995; pp. 703–714.

Development of the process model 10 further includes the modeling of the performance variable tool life based upon tool life values expressed in the form of:

$$T = \frac{C}{V^{\frac{1}{n}} f^{\frac{1}{m}} d^{\frac{1}{l}}} \quad (2)$$

Where:
T=tool-life
V=cutting speed
f=feed
d=depth of cut
C, n, m, and l=constants for given combination of work and tool material Note: All constants and exponents are used in conjunction with Equation 2 are experimentally obtained values, see Cook, N. K.; "Tool Wear and Tool Life"; ASME Journal of Engineering for Industry; 1973; Volume 93; pp. 931–938.

Further describing the method, development of the process model 10 includes modeling the performance variable material removal rate based upon material removal rate (MRR) values expressed in the form of:

$$MRR = 1000 Vfd \quad (3)$$

Where:
V=cutting speed m/min
f=feed mm/rev
d=depth of cut mm

While the performance variable surface roughness may be analytically determined in an approximate manner by considering the geometry of a given cutting tool, such calculations result in inaccurate determinations of surface roughness for finish turning operations. This is a result of finish turning operations involving a number of additional tool geometry-work material related features that are likely to influence the surface finish levels quite significantly. Therefore, the development of the process model 10 includes modeling the performance variable surface roughness based upon experimentally obtained values for combinations of different operating parameters.

More specifically describing the determination of surface roughness, the equipment used to measure the surface roughness may be, for example, a Taylor-Hopson Form Talysurf Surface Measuring System (Model S3C) complete with a Hewlett-Packard computer and a DAS unit. The undulations of a surface can be explored by its diamond stylus with a tip radius of 2 $\mu$m. More particularly, as the stylus moves over the surface irregularities, the signal will be conducted into the data acquisition system. The computer processes the data, and then gives the profile of the surface and the values of surface roughness. Cubic spline interpolation of the test data is then used to obtain the surface roughness function in terms of the operation variables. The effect of cutting speed on surface roughness is considered to be invariant within the cutting speed range of finish turning, and surface roughness is thereby reduced to the function of feed and depth of cut within the range of finishing cuts. This assumption is based on the fact that the surface roughness is most sensitive to changes in feed and least sensitive to changes in cutting speed for finish turning operations. Accordingly, this allows for development of the process model 10 to simultaneously take into consideration the performance variable surface roughness along with the other performance variables and process parameters.

Similarly, the performance variable chip breakability, which needs to be considered as one of the basic requirements in automated machine systems, cannot be accurately determined analytically and, therefore, must be determined based upon experimental test results. Particularly, chip breakability is not uniquely definable due to the inherent "fuzziness" in the understanding of the "acceptability" levels of chip-forms/shapes. The present invention utilizes the definition of chip breakability as given in the article Fang, X. D. and Jawahir, I. S., "The Effects of Progressive Tool Wear and Tool Restricted Contact on Chip Breakability in Machining", *Wear*, Volume 160, pages 243–52 (1993).

This definition of chip breakability assumes that the size, shape and difficulty/ease of chip producibility determines the levels of chip breakability, with weighing factors of 60%, 25% and 15%, respectively. According to the definition, the values of chip breakability range between 0 and 1. The fuzzy membership values are related to the fuzzy definition of chip breakability as shown in Table 1.

TABLE 1

The Definition of Chip Breakability

| Membership Values | Fuzzy Definition of Chip Breakability | Most Likely Chip Shapes/Sizes Produced in Machining |
|---|---|---|
| 0.0–0.2 | Absolutely unbroken | Large snarled, continuous and long size with large coil |
| 0.2–0.3 | Very difficult to break | Continuous and long, snarled with medium or large size |
| 0.3–0.45 | Usually difficult to break | Long (continuous or broken), snarled often with few turns or small in size |
| 0.45–0.5 | Less likely to break | Medium size, spiral with few turns |
| 0.5–0.58 | More likely to break | Short to medium size, flat spiral with medium size conical spiral and medium in size |

TABLE 1-continued

The Definition of Chip Breakability

| Membership Values | Fuzzy Definition of Chip Breakability | Most Likely Chip Shapes/Sizes Produced in Machining |
|---|---|---|
| 0.58–0.7 | Usually easy to break | Short size, full turn, flat or conical spiral and short in size |
| 0.7–0.9 | Very easy to break | Side-curl arcs or up-curl arcs |
| 0.9–1.0 | Always broken | Small up-curl or connected side-curl arcs |

As with the determination of the performance variable surface roughness, in order to determine chip breakability, the effect of cutting speed on chip breakability is ignored within the cutting speed range of finish turning, and bi-cubic spline interpolation is used to determine chip breakability in terms of feed and depth of cut. Based upon this information, the modeling of the performance variable chip breakability is possible for inclusion in the process model 10.

As should be appreciated, the completion of the information relating to the performance variables and the process parameters results in the establishment of the process model 10. Specifically, the process model 10 provides a database of experimental results to be used in conjunction with the methodology of the present invention which defines the relationships between the machining performance criteria and finish turning conditions. The creation of the process model 10 allows for an optimization procedure to be performed while taking all machinability parameters simultaneously into consideration.

Once the process model 10 has been created, the present method includes selecting an optimization objective, as designated by reference numeral 18 in FIG. 1. Specifically, multiple criteria optimization techniques are used to develop a utility function that relates the performance variables of tool life and material removal rate as the optimization objective 18. Of course, optimization includes either maximizing or minimizing one or more of the particular performance variables, based upon the particular needs of a given finish turning operation.

Furthermore, the remaining performance variables, as well as the process parameters, are used as constraints for defining acceptable limits on these variables. The designation of the remaining performance variables and the process parameters as constraints on the optimization procedure is generally designated as reference numeral 20 in FIG. 1.

The selection of the optimization objective in the present method includes applying multiple criteria optimization techniques such as provided for in Steuer, R. E., "*Multiple Criteria Optimization: Theory, Computation, and Application*", John Wiley & Sons, Inc.; 1986. As set forth in the article entitled "Multiple Criteria Optimization of Finish Turning Operations Based On A Hybrid Model" (Proceedings of the 1996ASME Design Engineering Technical Conference and Computers in Engineering Conference Aug. 18–22, 1996), the full disclosure of which is incorporated herein by reference, the standard multiple objective programming problem can be expressed as:

$$\max\{f_1(x) = z_1\}$$
$$\max\{f_2(x) = z_2\}$$
$$\vdots$$
$$\max\{f_k(x) = z_k\}$$
$$\text{subject to } x \in S$$

where:
$f_i(x)$=the i-th individual objective function;
Vector x=the design or process variable vector; and
S=the feasible region.

Excluding the trivial case in which a point exists in the feasible region S that simultaneously maximizes/minimizes all k objectives, the ideal approach to solve a multiple objective program would be to assess the decision maker's utility function and to solve the mathematical programming problem. This utility function can be expressed as:

$$\max\{U(z_1, z_2, \ldots, z_k)\}$$
$$\text{subject to } f_i(x) = z_i \quad 1 \leq i \leq k$$
$$x \in S$$

This utility function U maps the criterion vector into the real line so that the greater the value along the real line, the more preferred is the criterion vector. Different utility function shapes have different implications for multiple criteria analysis.

In finish turning, the surface roughness, dimensional accuracy, chip breakability, cutting force and cutting power may be predetermined as constraints based on functions of, among other things, the component, machine power availability, and chip disposal method. Economic production in a finish turning process is concerned with a higher metal removal rate and longer tool-life in relation to other machining performance criteria. However, increasing productivity through higher material removal rate (higher cutting speed, feed, and depth of cut) will unavoidably result in decreasing tool-life. A shorter tool-life will increase cutting tool cost and will require more frequent replacement of tool inserts, thus resulting in costly interruptions in the machining process. Therefore, the method of the current invention includes establishing the utility function for multiple objective programming problems based on material removal rate and tool-life.

One such utility function may be established by applying a weighted sums approach. In this method, each individual objective is multiplied by a strictly positive scalar weight $w_i$. Then, the k weighted objectives are summed to form a multiple objective function. For the optimization of the process where the focus is on the tool life and the material removal rate, this utility function may be expressed as:

$$U(V,f,d) = w_1 \lambda T(V,f,d) + w_2 M(V,f,d) \tag{4}$$

where:
U=utility function
$w_1$=weight factor for tool-life
$w_2$=weight factor for material removal rate
T=tool-life
M=material removal rate
$\lambda$=tool-life normalizing constant This utility function represents the efficiency of the machining process expressed in terms of the volume of material removal in a given time interval. The weight factors $w_1$ and $w_2$ represent the contributions of tool life and material removal rate to the efficiency which may be selected by the process planner, as discussed below. These weights may take values from 0 to 1 such that:

Thus, if $w_1$ is set to 0, the optimization objective becomes maximization of the material removal rate, thus meaning that tool life is of little importance. Conversely, setting $w_2=0$ means that tool life is the optimization objective. Depending on the relative importance attached to the two individual functions, the process planner may select these weights in order to achieve the desired optimization objective.

The constant multiplier $\lambda$ is used to normalize the function and is of the form.

$$\lambda = \frac{t_{ra} M}{T^2} \quad (5)$$

where:
- $t_{ra}$=tool replacement and adjustment time
- M=maximum material removal rate under same process constraints
- T=maximum tool-life under same process constraints As the optimization objective is to maximize both the tool life and material removal rate and the numerical values of these performance variables will be obtained during the optimization search, only tool adjustment time is needed to evaluate this factor. As a practical matter, tool adjustment time is easy to estimate.

Another possible utility function based upon the tool life and material removal rate is constructed by the multiplication of these two individual objective functions. This utility function is the maximum tool usage criterion for the machining process and is of the form $$U(V,f,d) = T(V,f,d) M(V,f,d) \quad (6)$$

where:
- U=maximum tool usage criterion
- T=tool-life
- M=material removal rate This tool usage criterion expresses the utility of the process in terms of volume of material removed prior to tool failure.

Following selection of the optimization objective 18 and the setting of constraints 20, the method of the present invention includes the step of applying non-linear programming techniques to the process model 10. More specifically, the method includes applying non-linear programming techniques 22 to the process model 10 so that optimum cutting conditions may be determined for a given tool insert and/or an optimum tool insert may be selected for given machining performance requirements.

The preferred embodiment of the present invention utilizes the sequential quadratic programming method to perform the optimization. This particular non-linear programming method is set forth and described in detail in Vanderplaats, G. N., "*Numerical Optimization Technologies for Engineering Design with Applications*", McGraw Hill Book Company, 1984. Accordingly, by applying the non-linear programming techniques 22, the present invention allows for the determination of optimum cutting conditions for a given tool insert or for the determination of an optimum tool insert for given machining performance requirements as designated by reference numeral 24.

Additionally, a step may be included in the above method for considering the progressive tool wear that occurs during the machining process. In order to take the tool wear into account, a manner of recording the tool wear state must first be developed.

A new tool life model for coated grooved tools has recently been developed and is of the form $$T = T_R W_g \left(\frac{V_R}{V}\right)^{W_c \frac{1}{n}} \quad (7)$$

where
- T=tool life
- V=cutting speed
- n=Taylor's tool-life exponent
- $W_c$=tool coating effect factor
- $W_g$=chip-groove effect factor
- $T_R$=reference tool-life
- $V_R$=reference cutting speed and $$W_c = \frac{n}{n_c} \quad (8)$$

where
- $n_c$=actual tool-life slope modified by the coating effect and $$W_g = \frac{km}{f^{n_1} d^{n_2}} \quad (9)$$

where
- m=machining operation effect factor
- $n_1$, $n_2$, k=constants.

In order to determine the tool wear rate, the reciprocal of the tool life is taken, which produces the form $$R = \frac{1}{kmC} V^{n_3} f^{n_1} d^{n_2} \quad (10)$$

where $$n_3 = \frac{1}{n_c} \text{ and } C = T_R (V_R)^{\frac{1}{n_c}} \quad (11)$$

The tool wear rate can be expressed as a tool-wear index for a tool that has been used in N known previous operations in the form of $$W = \sum_{i=1}^{n} R_i t_i = \frac{1}{kmC} V_i^{n_3} f_i^{n_1} d_i^{n_2} t_i \quad (12)$$

where
- w=tool wear index
- $t_i$=time interval of the i-th operation

This form may also be used to describe the tool wear state as the cutting parameters vary during the tool wear process $$W = \sum_{i=1}^{N} \left(\int_0^{\tau_i} R_i dt\right) = \sum_{i=1}^{N} \left(\int_0^{\tau_i} \frac{1}{kmC} V_i^{n_3} f_i^{n_1} d_i^{n_2} dt\right) \quad (13)$$

According to this definition, the tool wear index for a new tool is 0 and when the value of w reaches 1, the tool has failed.

In addition to considering the tool life and the tool wear rate, the progression of overall tool wear must also be taken into consideration as a factor affecting the machining performance. The machining performance for a tool insert after some known usage can be predicted by $$p = C_p(w) * p_u(V, f, d) \tag{14}$$

where p = a performance variable after some known usage;
$p_u$ = a performance variable for an unworn tool;
$C_p$ = tool wear effect on the performance variable p.

This may also be written in the form of a ratio $$C_p(w) = \frac{p}{p_u(V, f, d)} \tag{15}$$

thereby showing the tool wear effect on a performance variable expressed in terms of the performance variable at a worn state and the performance variable in its unworn state. Using experimental observation coupled with numerical methods, this function may be determined such that the relationship between the performance variable and the cutting parameters for the tool insert in the unworn state may be determined. Numerical methods, such as bi-cubic spline interpolation, can be used to obtain the relationship between performance variables and cutting parameters for a given tool wear index, w. These relationships may then also be considered in the optimization process.

Advantageously, the preferred embodiment of the present invention includes a computer program developed as copyrighted software entitled OFTO Software II, the full disclosure of which is incorporated herein by reference. The computer program facilitates the application of the methodology described above for achieving optimum machining performance in finish turning operations.

The following examples are presented to further illustrate the usefulness of the present method, and more particularly the implementation of the present method, but the examples are to be considered as illustrative and the invention is not considered to be limited thereto.

EXAMPLE 1

As previously described, the present method allows for the determination of optimum machining conditions for a given tool insert. In this first example, the utility functions are used to relate the tool life and material removal rate and the remaining performance variables, cutting force, surface roughness, and chip breakability are set as constraints of the optimization process. For this example, the maximum allowed cutting force is assumed to be 400N and the maximum power is 5 kW. The acceptable surface roughness is set to 0.8 µm and the acceptable chip breakability is assumed as 0.45.

This example relies on a database of experimentally obtained results for a given tool (see

TABLE 2

| Test Data for a Particular Tool Insert | | | | |
|---|---|---|---|---|
| Performance: | Surface Roughness (µm) | | | |
| Depth of cut (mm)/ Feed (mm/rev) | 0.254 | 0.635 | 1.016 | 1.905 |
| 0.056 | 0.584 | 0.660 | 0.508 | 0.508 |
| 0.074 | 0.635 | 0.762 | 0.559 | 0.737 |
| 0.107 | 0.762 | 0.838 | 0.737 | 0.838 |
| 0.130 | 1.041 | 1.067 | 0.914 | 1.041 |

TABLE 2-continued

| Test Data for a Particular Tool Insert | | | | |
|---|---|---|---|---|
| Performance: | Cutting Force (N) | | | |
| Depth of cut (mm)/ Feed (mm/rev) | 0.254 | 0.635 | 1.016 | 1.905 |
| 0.056 | 107 | 152 | 223 | 338 |
| 0.074 | 120 | 183 | 254 | 459 |
| 0.107 | 152 | 227 | 317 | 584 |
| 0.130 | 169 | 259 | 384 | 700 |
| Performance: | Chip Breakability (0–1) | | | |
| Depth of cut (mm)/ Feed (mm/rev) | 0.254 | 0.635 | 1.016 | 1.905 |
| 0.056 | 0.10 | 0.10 | 0.20 | 0.12 |
| 0.074 | 0.10 | 0.12 | 0.20 | 0.15 |
| 0.107 | 0.50 | 0.70 | 0.80 | 0.16 |
| 0.130 | 0.50 | 0.75 | 0.70 | 0.24 |

Based on these results, the limits on the ranges of the process variables are 230–400 m/min for cutting speed, 0.056–0.254 mm/rev for feed and 0.254–1.905 mm for depth of cut. The Taylor constant and other exponents for the tool life equation may also be determined from these experimentally obtained results (C=214233, n=0.642, m=1.815, and l=1.337).

Using the maximum efficiency criterion, $w_1$ and $w_2$ are alternatively set to zero in order to obtain the maximum tool life and material removal rates. After setting $w_1$ to zero and obtaining $M_{max}$, and assuming the time for tool replacement and adjustment is 12 minutes, $T_{max}$ may then be obtained. For this example, it is determined that $M_{max}$ is 56,300 mm³/min and $T_{max}$ is 16.4 minutes. Using these results, the normalization factor λ can be estimated and the maximum efficiency criterion expressed as $$U(V, f, d) = \frac{3140C}{V^{1/n} f^{1/m} d^{1/l}} w_1 - 1000 V f d w_2$$

Figure 2:
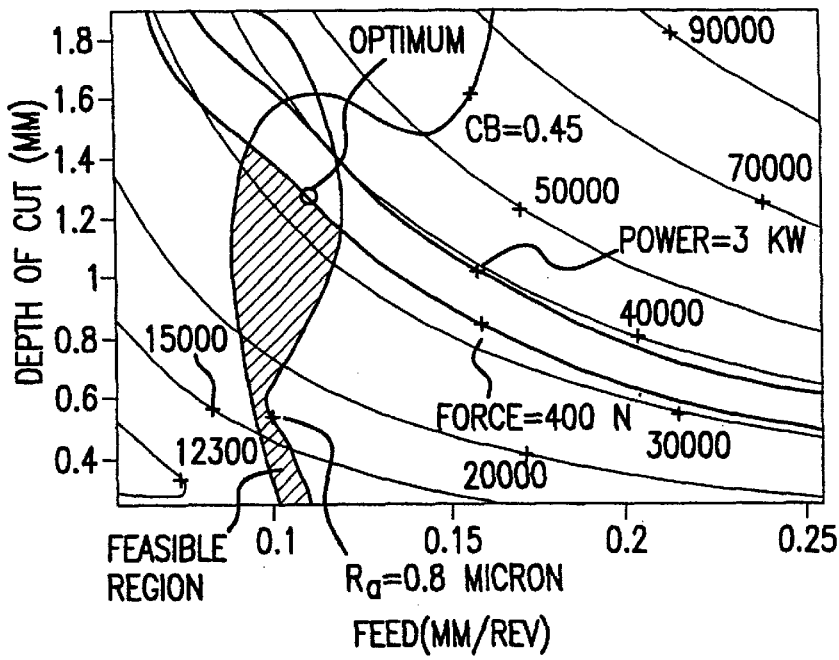
FIG. 2 is a graphical display showing the objective contours and constraints for the maximum efficiency criterion as set forth in Example 1 wherein the metal removal rate is emphasized.
Figure 3:
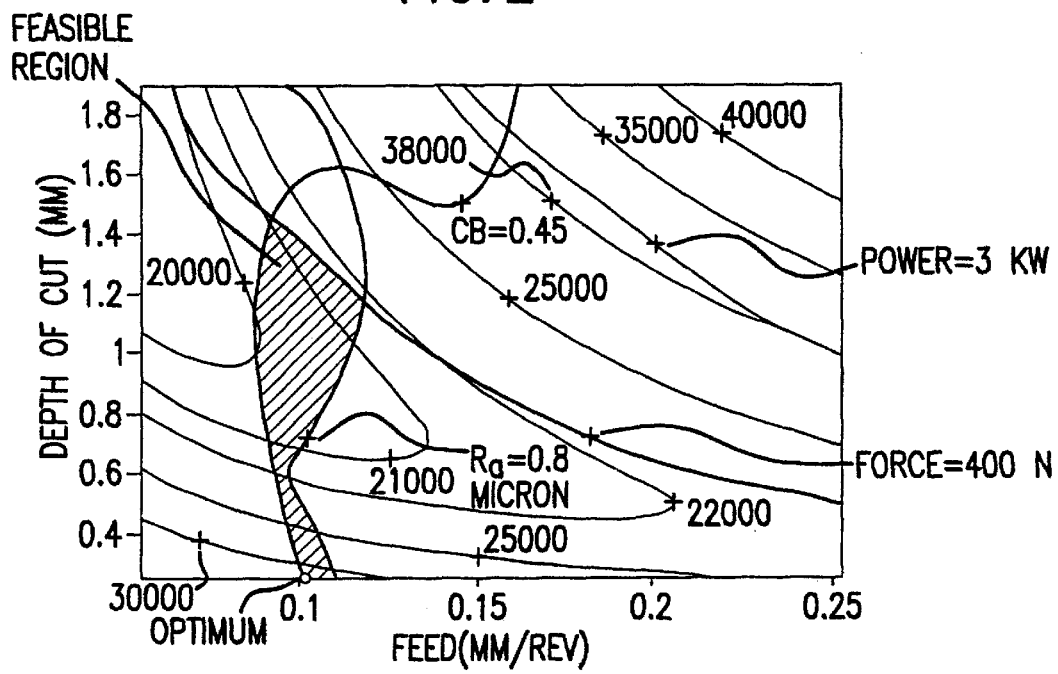
FIG. 3 is a graphical display showing the objective contours and constraints for the maximum efficiency criterion as set forth in Example 1 wherein the tool life is emphasized.

The process planner may then select different values for the weight factors in order to emphasize either the tool life or the material removal rate. In this example, sets of solutions to this function are provided for $w_1$=0.4, $w_2$ =0.6 (emphasis on material removal rate) and $w_1$=0.6, $w_2$ =0.4 (emphasis on tool life). The results are presented in Table 3 and FIGS. 2 and 3, respectively.

TABLE 3

| Optimum Solutions for the Sample Case | | | |
|---|---|---|---|
| | Maximum Efficiency Criterion $w_1$ = 0.4 $w_2$ = 0.6 | Maximum Efficiency Criterion $w_1$ = 0.6 $w_2$ = 0.4 | Maximum Tool Usage Criterion |
| cutting speed (m/min) | 381 | 230 | 230 |
| feed (mm/rev) | 0.108 | 0.102 | 0.118 |
| depth of cut (mm) | 1.299 | 0.254 | 1.175 |
| surface roughness $R_a$ (µm) | 0.721 | 0.720 | 0.800 |
| cutting force (N) | 400 | 147 | 400 |
| cutting power (KW) | 2.54 | 0.56 | 1.533 |
| chip breakability | 0.71 | 0.45 | 0.737 |

TABLE 3-continued

Optimum Solutions for the Sample Case

|  | Maximum Efficiency Criterion $w_1 = 0.4$ $w_2 = 0.6$ | Maximum Efficiency Criterion $w_1 = 0.6$ $w_2 = 0.4$ | Maximum Tool Usage Criterion |
|---|---|---|---|
| material removal rate (mm³/min) | 53620 | 5938 | 32140 |
| tool-life (min) | 1.57 | 16.39 | 4.782 |
| utility function | 34140 (mm³/min) | 33267 (mm³/min) | 153690 (mm³) |

As can be seen, in the first case ($w_1$=0.4, $w_2$=0.6), the process will use large cutting speed and depth of cut within the given constraints, as material removal rate is more important than tool life, and cutting force becomes the critical constraint. Using these results, the volume of material removed in a unit time interval may be determined as follows:

$$M \frac{T}{T + t_{ra}} = 53{,}620 * \frac{1.57}{1.57 + 12} = 6204 \, \text{mm}^3$$

In the second case ($w_1$=0.6, $w_2$=0.4), the cutting speed and depth of cut become as small as possible because the emphasis is placed on tool life and chip breakability is the critical constraint. Using the above method, the volume of material removed in this case is 3428 mm³.

Thus, it can be seen that the value of the maximum efficiency criterion is greater in the first case than in the second case. This determination allows the process planner, taking into account other factors, such as the tool insert cost, to determine the optimum machining conditions. The process planner may also obtain numerical results for a variety of different combinations of weight factors, thereby allowing him or her to choose a particular solution based on the practical considerations presented.

Figure 4:
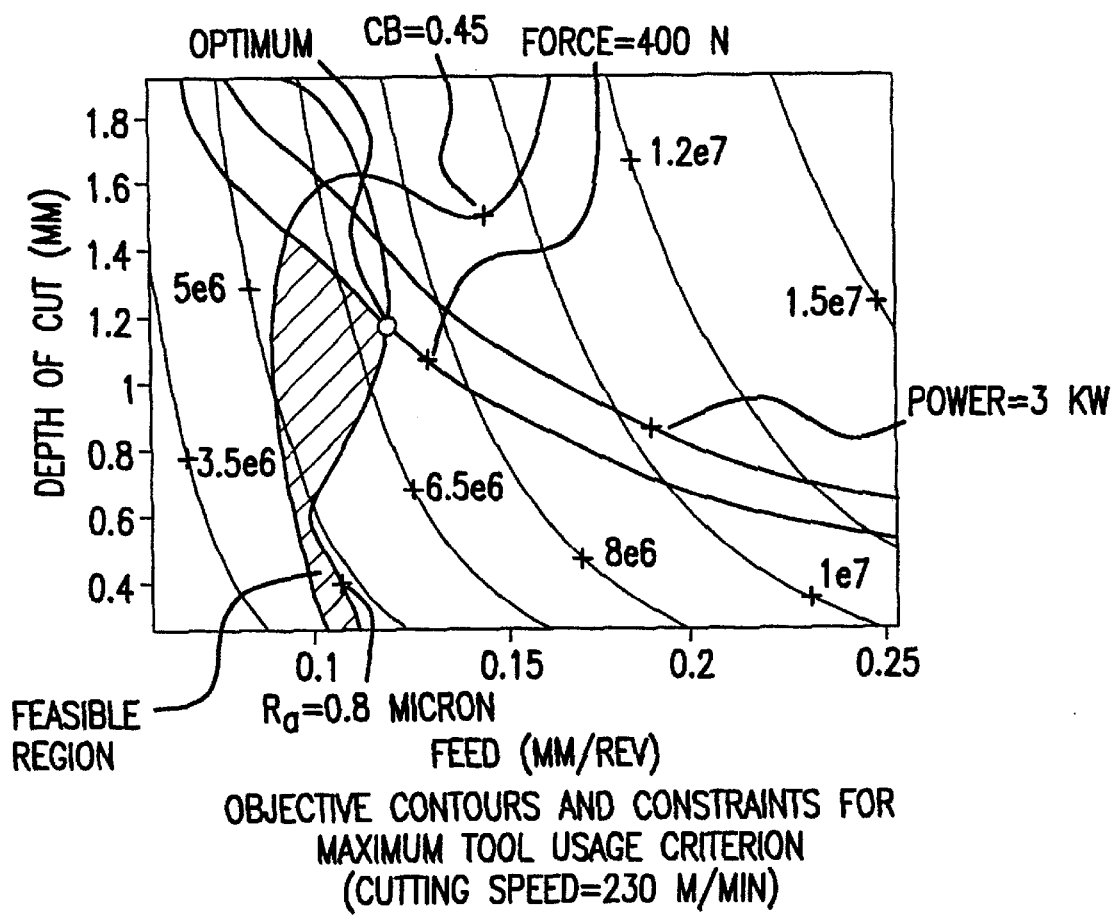
FIG. 4 is a graphical display showing the objective contours and constraints for the maximum tool usage criterion as set forth in Example 1.

Second, the maximum tool usage criterion may be applied to the problem, using the same constraints as outlined above. The optimum results for this function are also expressed in Table 3 and FIG. 4. As can be leads to the smallest allowed cutting speed and the largest allowed feed and depth of cut. Also, the cutting force and the surface roughness are the critical constraints. Although the interactive procedures used in the maximum efficiency criterion are not available for the maximum tool usage criterion, the utility function is more stable and still allows the process planner to select the optimum machining conditions for a given tool insert.

EXAMPLE 2

Figure 5:
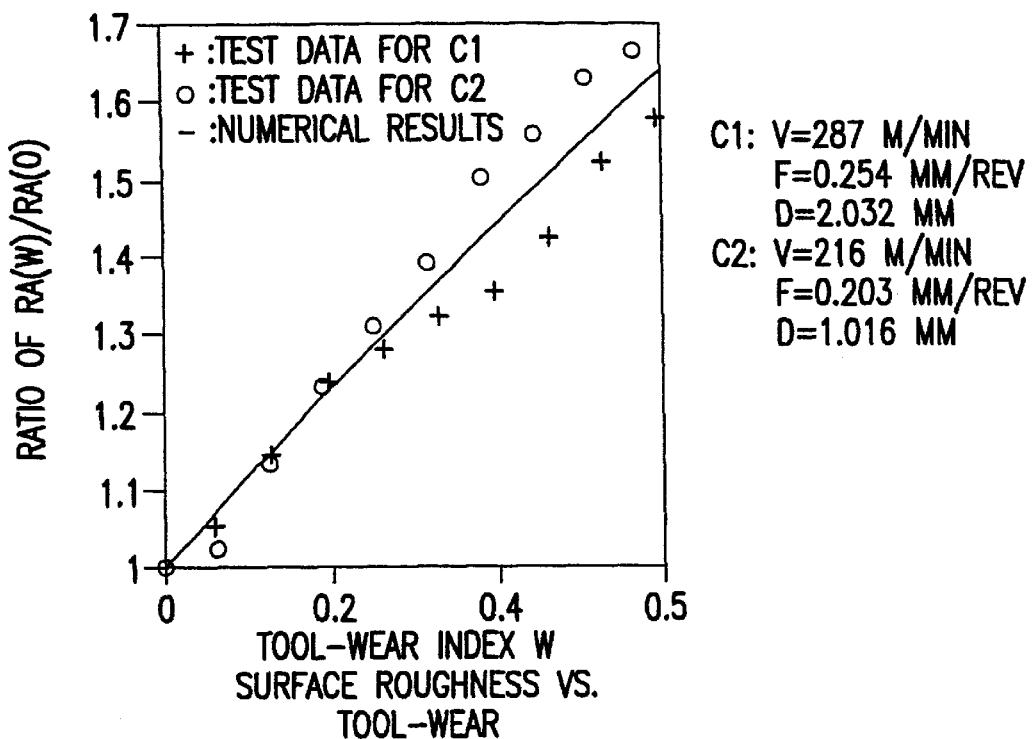
FIG. 5 is a graphical display showing the experimental and numerical results of the surface roughness versus tool wear as set forth in Example 2.
Figure 6:
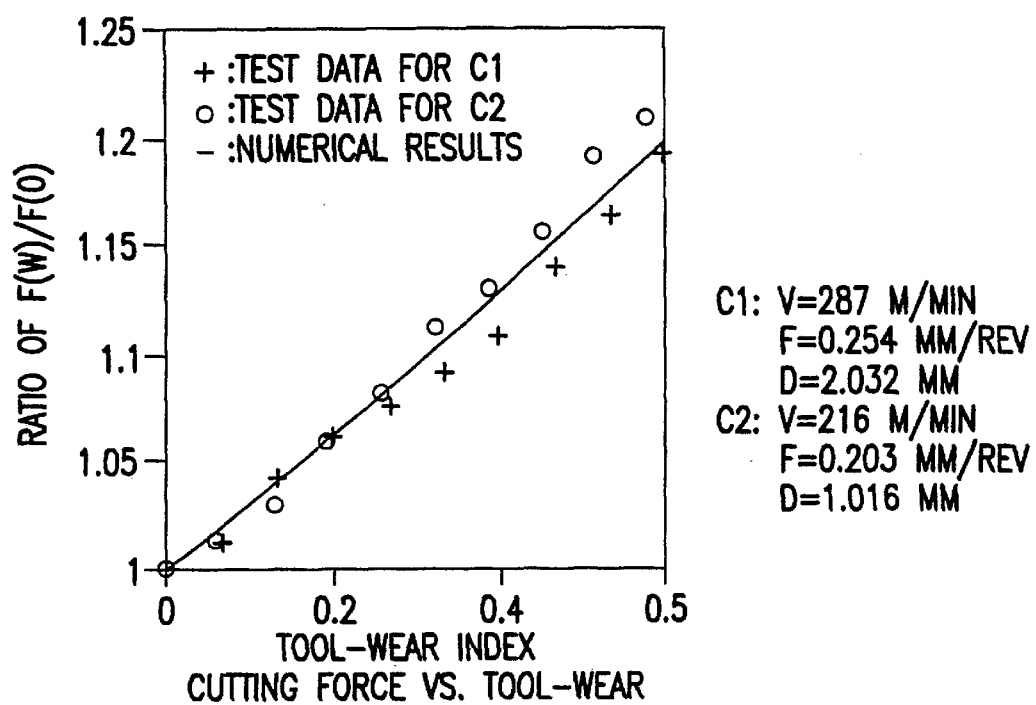
FIG. 6 is a graphical display showing the experimental and numerical results of the cutting force versus tool wear as set forth in Example 2.
Figure 7:
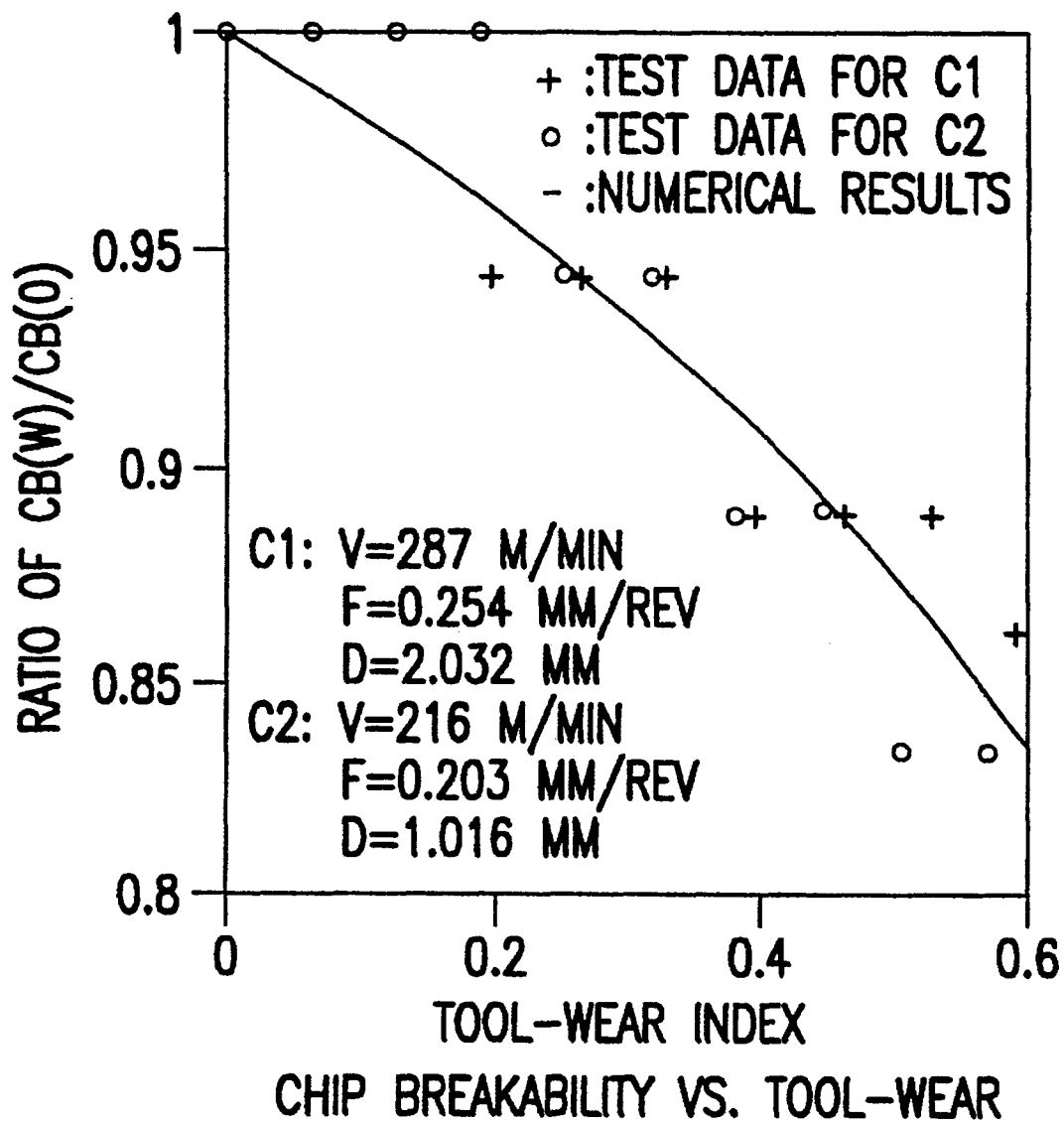
FIG. 7 is a graphical display showing the experimental and numerical results of the chip breakability versus tool wear as set forth in Example 2.

This example includes the step of considering the progressive tool wear state in determining the optimum machining conditions. In order to determine the tool wear state, relationships between the performance variables of surface roughness, cutting force, and chip breakability and the tool wear index must be established using experimental results and numerical methods. Two different cutting conditions are used: C1 (V=287 m/min, f=0.254 mm/rev, d=2.032 mm) and C2 (V=216 m/min, f=0.203 mm/rev, d=1.016 mm). Table 4 and FIGS. 5, 6 and 7 show the experimental and numerical results of the ratios of surface roughness $R_a(w)/R_a(0)$, cutting force $F(w)/F(0)$ and chip breakability $CB(w)/CB(0)$ in terms of the tool wear index, where $R_a(0)$, $F(0)$ and $CB(0)$ are the values of surface roughness, cutting force and chip breakability for the unworn tool at the given set of cutting parameters.

TABLE 4

Test Data for Surface Roughness $R_a$ (μm), Cutting Force (N) and Chip Breakability (CB)

| f (mm/rev)/ d (mm) | 0.102 | 0.152 | 0.203 |
|---|---|---|---|
| 1.016 | $R_a$ = 0.685<br>F = 165<br>CB = 0.35<br>w = 0.505 | $R_a$ = 1.428<br>F = 214<br>CB = 0.425<br>w = 0.472 | $R_a$ = 2.116<br>F = 243<br>CB = 0.45<br>w = 0.414 |
| 1.524 | $R_a$ = 0.684<br>F = 246<br>CB = 0.325<br>w = 0.509 | $R_a$ = 1.358<br>F = 321<br>CB = 0.475<br>w = 0.479 | $R_a$ = 2.075<br>F = 390<br>CB = 0.6<br>w = 0.426 |
| 2.032 | $R_a$ = 0.617<br>F = 330<br>CB = 0.3<br>w = 0.513 | $R_a$ = 1.450<br>F = 414<br>CB = 0.625<br>w = 0.490 | $R_a$ = 2.160<br>F = 500<br>CB = 0.75<br>w = 0.444 |
| 2.540 | $R_a$ = 0.603<br>F = 377<br>CB = 0.25<br>w = 0.520 | $R_a$ = 1.402<br>F = 495<br>CB = 0.75<br>w = 0.503 | $R_a$ = 2.225<br>F = 614<br>CB = 0.85<br>w = 0.468 |

| f (mm/rev)/ d (mm) | 0.254 | 0.305 | 0.356 |
|---|---|---|---|
| 1.016 | $R_a$ = 2.757<br>F = 293<br>CB = 0.475<br>w = 0.324 | $R_a$ = 3.387<br>F = 343<br>CB = 0.5<br>w = 0.195 | $R_a$ = 3.525<br>F = 335<br>CB = 0.5<br>w = 0.022 |
| 1.524 | $R_a$ = 2.749<br>F = 455<br>CB = 0.75<br>w = 0.343 | $R_a$ = 3.366<br>F = 532<br>CB = 0.8<br>w = 0.222 | $R_a$ = 3.512<br>F = 603<br>CB = 0.8<br>w = 0.058 |
| 2.032 | $R_a$ = = 2.741<br>F = 600<br>CB = 0.8<br>w = 0.370 | $R_a$ = 3.333<br>F = 689<br>CB = 0.85<br>w = 0.261 | $R_a$ = 3.503<br>F = 783<br>CB = 0.85<br>w = 0.110 |
| 2.540 | $R_a$ = 2.806<br>F = 742<br>CB = 0.85<br>w = 0.407 | $R_a$ = 3.407<br>F = 807<br>CB = 0.9<br>w = 0.313 | $R_a$ = 3.728<br>F = 992<br>CB = 0.925<br>w = 0.179 |

Using the least square method, the following functions are then obtained to relate the variations of surface roughness, cutting force and chip breakability with the tool wear index for a given tool insert:

$$R_a(w)/R_a(0) = (1 + 1.6103w)^{0.7315}$$

$$F(w)/F(0) = (1 + 0.0996w)^{3.1681}$$

$$CB(w)/CB(0) = (1 - 1.1384w)^{0.1588}$$

The experimental data is then converted into the corresponding data for an unworn cutting tool using these functions to determine $C_p(w)$. The method of Example 1 can then be used to determine the optimum cutting conditions based on maximum tool usage criterion. The resulting data is shown in Table 5.

TABLE 5

Optimum Solutions for the Sample Case

| Cutting Conditions & Performance Parameters | Constraints | With No Tool-Wear Effect | With Tool-Wear Effect |
|---|---|---|---|
| cutting speed (m/min) | 230–450 | 230 | 230 |
| feed (mm/rev) | 0.102–0.356 | 0.155 | 0.172 |
| depth of cut (mm) | 1.016–1.524 | 1.604 | 1.472 |
| surface roughness ($\mu$m) | 2.5 | 1.398 | 1.667 |
| cutting force (N) | 340 | 340 | 340 |
| cutting power (KW) | 2.0 | 1.303 | 1.303 |
| chip breakability | 0.5 | 0.5 | 0.5 |
| objective function (m$^3$) | | 0.009323 | 0.007827 |

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A method for selecting optimum machining performance criteria in finish turning operations, said method comprising the steps of:

developing a process model relating performance variables for said operation with process parameters for said operation;

applying multiple criteria optimization techniques to construct a utility function, said utility function relating said performance variables of tool life and material removal rate;

selecting the utility function for optimization, using surface roughness, cutting power, and chip breakability as constraints to define acceptable limits on these machining performance measures along with limits placed on the ranges of the process variables;

applying non-linear programming techniques to said process model; whereby optimum cutting conditions may be selected for a given tool insert or an optimum tool insert may be selected for given machining performance requirements.

2. The method as set forth in claim 1, wherein development of said process model includes modeling said performance variable cutting force based upon cutting force values expressed in the form of $$F_z = C_z f^{\alpha_z} d^{\beta_z} + E_z d^{\gamma_z}$$

where:

F$_z$=component of cutting force in the cutting direction f=feed d=depth of cut

C$_z$ and E$_z$=force constants $\alpha_z$=feed exponent $\beta_z$ and $\gamma_z$=depth of cut exponents.

3. The method as set forth in claim 2, wherein development of said process model includes modeling said performance variable tool life based upon tool life values expressed in the form of $$T = \frac{C}{V^{\frac{1}{n}} f^{\frac{1}{m}} d^{\frac{1}{l}}}$$

where:

T=tool-life

V=cutting speed f=feed d=depth of cut

C, n, m, and l=constants for given conformation of work and tool material.

4. The method as set forth in claim 3, wherein development of said process model includes modeling said performance variable material removal rate based upon material removal rate values expressed in the form of $$MRR = 1000 \, Vfd$$

where:

V=cutting speed m/min f=feed mm/rev d=depth of cut mm.

5. The method as set forth in claim 4, wherein development of said process model includes modeling said performance variables surface roughness and chip breakability by applying numerical methods of data interpolation to experimentally obtained surface roughness and chip breakability data.

6. The method as set forth in claim 5, wherein said process parameters are selected from the group consisting of cutting speed, feed and depth of cut.

7. The method set forth in claim 1, wherein said utility function comprises a maximum efficiency criterion for the machining process of the form $$U(V,f,d) = w_1 \lambda T(V,f,d) + w_2 M(V,f,d)$$

where

U=maximum efficiency criterion w$_1$=weight factor for tool-life constant w$_2$=weight factor for material removal rate T=tool-life M=material removal rate $\lambda$=tool-life normalizing constant and where $$w_1 + w_2 = 1$$

whereby the weight factors may be adjusted to emphasize either the tool life or the material removal rate.

8. The method set forth in claim 7, wherein the tool-life normalizing constant is of the form $$\lambda = \frac{t_{ra}M}{T^2}$$

where:

$t_{ra}$=tool replacement and adjustment time

M=maximum material removal rate under same proven constraints

T=tool-life under same process constraints.

9. The method set forth in claim 1, wherein said utility function comprises a maximum tool usage criterion for the machining process of the form $$U(V,f,d)=T(V,f,d)M(V,f,d)$$

where:

U=maximum tool usage criterion

T=tool-life

M=material removal rate.

10. The method set forth in claim 1, including the steps of recording the tool wear state and using numerical methods to establish relationships between said tool wear state and performance variables, whereby the progressive tool wear state is considered in determining optimum cutting conditions.

11. The method set forth in claim 10, wherein the tool wear state is represented by a tool wear index of the form $$W = \sum_{i=1}^{n} R_i t_i = \frac{1}{kmC} V_i^{n_3} f_i^{n_1} d_i^{n_2} t_i.$$

12. The method set forth in claim 10, wherein the tool wear state is represented by a tool wear index of the form $$W = \sum_{i=1}^{N} \left( \int_0^{t_i} R_i dt \right) = \sum_{i=1}^{N} \left( \int_0^{t_i} \frac{1}{kmC} V_i^{n_3} f_i^{n_1} d_i^{n_2} dt \right).$$

13. The method set forth in claim 10, wherein the relationship between the tool wear state as a function of said tool wear index and said performance variable is of the form $$p=C_p(w)*p_u(V,f,d)$$

where p=a performance variable after some known usage;

$p_u$=a performance variable for an unworn tool;

$C_p$=tool wear effect on the performance variable p.

* * * * *